April 30, 1946.  C. STEVENS  2,399,582
ELECTRICAL INSPECTION AND SORTING APPARATUS
Filed Feb. 17, 1943  4 Sheets-Sheet 1

Charles Stevens INVENTOR.
BY

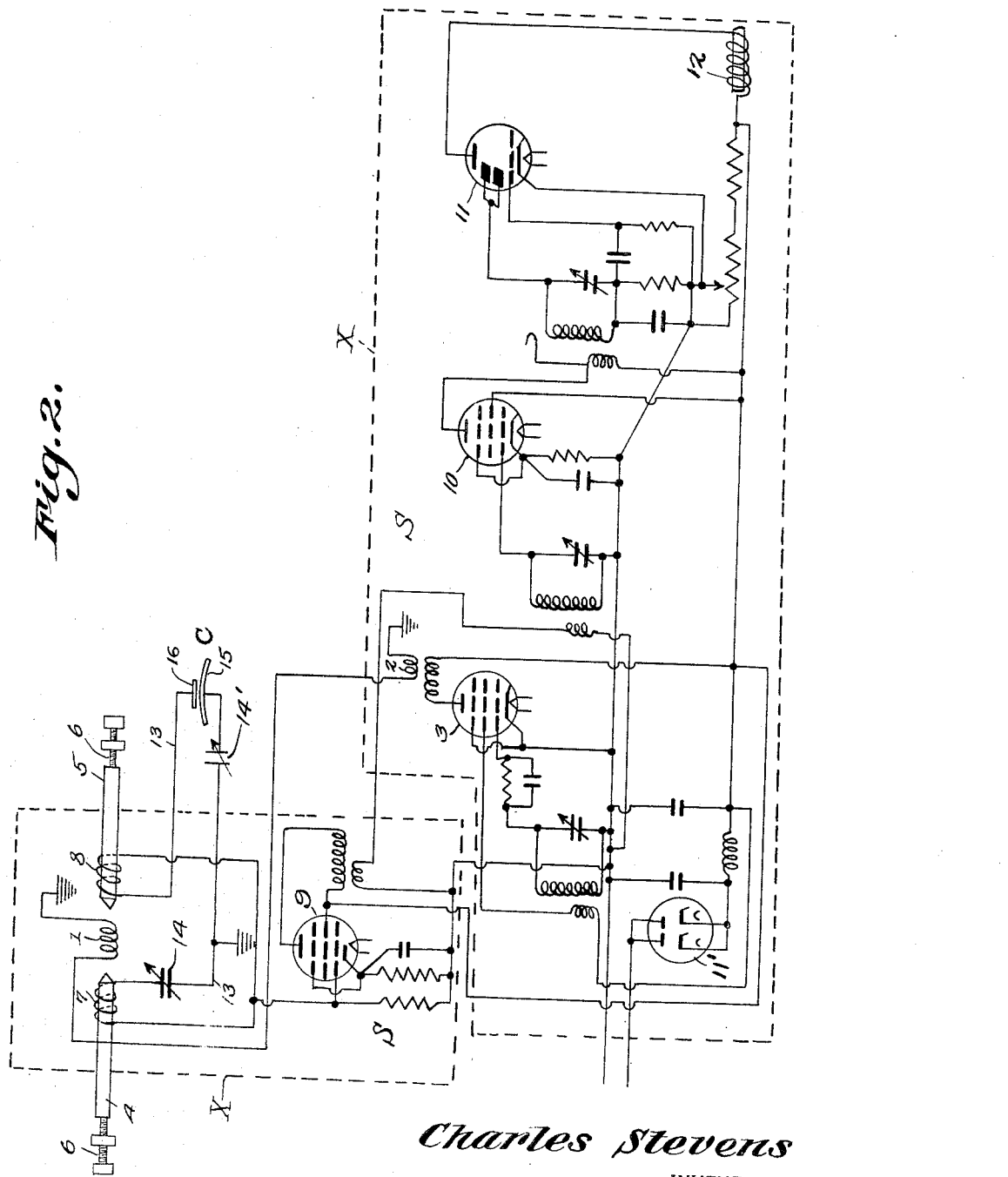

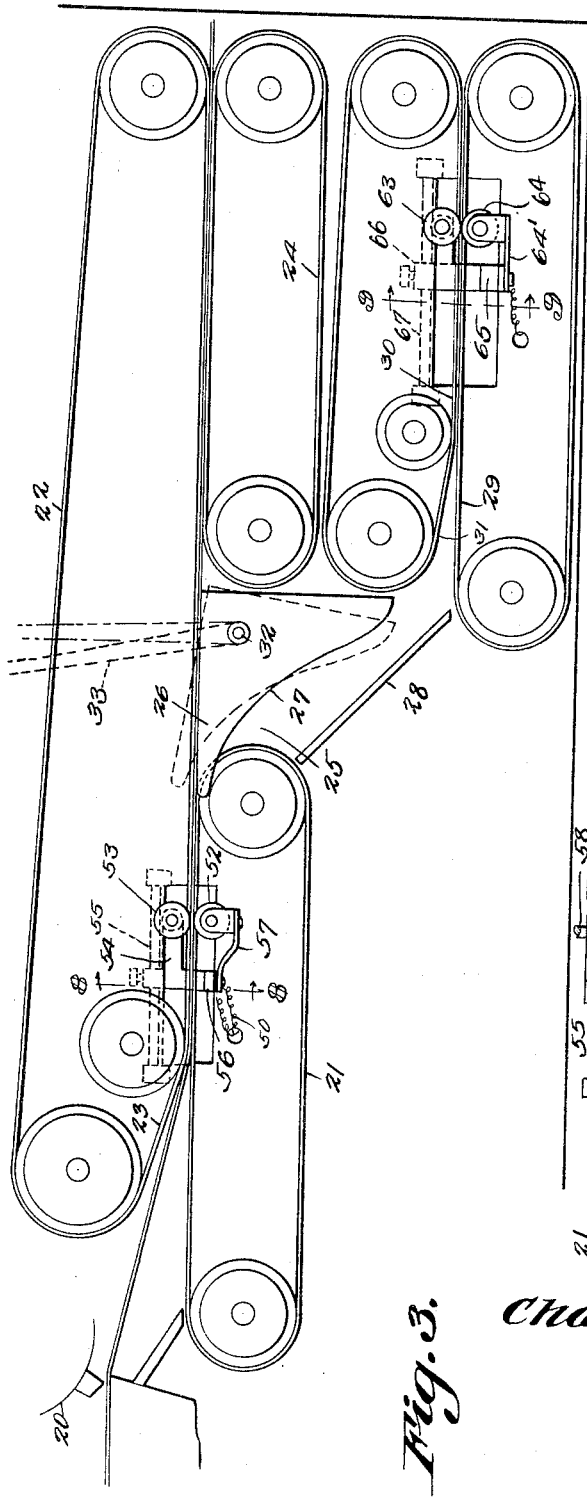

April 30, 1946.  C. STEVENS  2,399,582
ELECTRICAL INSPECTION AND SORTING APPARATUS
Filed Feb. 17, 1943  4 Sheets-Sheet 4
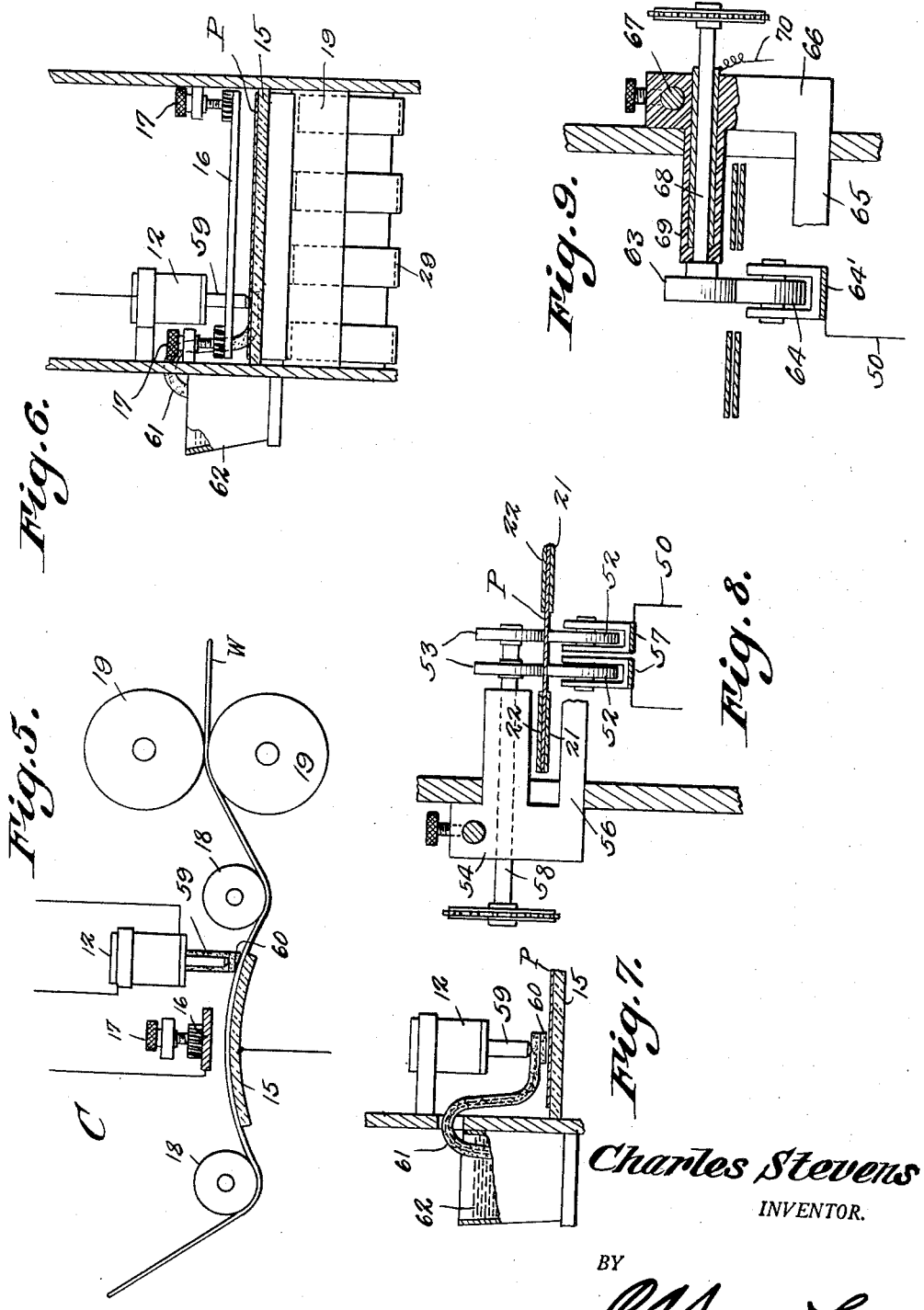
Charles Stevens
INVENTOR.
BY Patented Apr. 30, 1946

2,399,582

UNITED STATES PATENT OFFICE 2,399,582

ELECTRICAL INSPECTION AND SORTING APPARATUS

Charles Stevens, Wellston, Ohio

Application February 17, 1943, Serial No. 476,234

5 Claims. (Cl. 209—81)

This invention relates to electrical inspection and sorting apparatus and is designed primarily for the accurate exploration of material under test and the instant indication of structural flaws.

In many arts it is highly desirable to maintain materials at a uniform grade or standard but many kinds of structural defects are encountered and these, because of their diverse nature, have heretofore required separate tests to determine their presence but these generally have not been satisfactory. In the sheet paper industry, for example, it has been extremely difficult to eliminate automatically those sheets defective because of faulty structure, such as visible specks, lack of proper surface finish, variations in thickness, etc. Moisture tests have been made satisfactorily but otherwise a visual inspection generally has been required following any electrical or mechanical tests that have been made.

An object of the present invention is to embody in a simple, inexpensive and compact structure, a means whereby any minute variation from the predetermined standards set for the product can be indicated instantly, either visually or audibly if desired, and sets in motion certain electro-mechanical means whereby the defective or below-grade portions of the product under test will be separated automatically from those portions meeting the test.

Another object of the invention is to provide a normally balanced circuit in which is included a power generator consisting of a feeder coil and opposed pick-up coils, there being an oscillator tube for supplying pulsations to the feeder coil to set up a field which is coupled to the pick-up coils thereby creating an induced current in the pick-up coils which, in turn, is transmitted to a detecting and amplifying system by way of condensers at opposite sides of the generator, one condenser being adjustable to effect a balanced circuit while the other is affected by structural changes in the material under test and, when disturbed at a normal setting, causes the creation of impulses to be picked up and amplified for signal or other purposes.

Another object is to utilize means whereby changes in material under test will effect changes in a dielectric constant and the capacitance of a capacity element of which it forms a part, these variations in turn being detected and amplified for utilization in the actuation of selective or other mechanism included as a part of the apparatus.

Another object is to include the fault detecting element (condenser) in one side of a circuit having means whereby, when material of desired quality is moving within the condenser, said circuit can be placed in perfect balance, the said circuit including a feeder coil and opposed magnets of high permanence, the said magnets having coils of very high impedance 180° out of phase, so that any variations in dielectric constant of the media in the condenser due to variations in physical characteristics of the material under test will set up variations in the field between said coil and the magnets, thereby throwing the circuit out of balance so that pulsations are thus produced which thereafter are amplified for the purposes desired.

Another object is to provide a fault detector in the form of a condenser of new and novel construction one plate of which is dielectric and acts in cooperation with moving material under test.

A further object is to provide a condenser having a plate of conductive material adjustable to a desired position relative to the dielectric plate, there being an adjustable valve providing leakage from the dielectric plate to prevent the potential between the plates of the condenser from reaching such proportions as to overcharge the capacity.

A still further object is to provide the normally balanced field with magnets and pick-up coils which are adjustable relative to the feeder coil associated therewith so that the opposed magnetic fields in the circuit can be equalized and remain undisturbed except by variations in the capacity at one side of the circuit.

With the foregoing and other objects in view which will appear as the description proceeds, the invention resides in certain new and novel steps in the method and certain features of construction which will be pointed out hereinafter more in detail, it being understood that changes may be made in the invention as disclosed without departing from the spirit of the invention as claimed.

In the accompanying drawings the invention has been disclosed embodied in an apparatus for testing a web of paper, textile, or other strip material of a dielectric nature.

In said drawings

Figure 2 is a view showing, in diagram, the detector and the electrical apparatus associated therewith.

Figure 3 is a side elevation, more or less in diagram, illustrating means which can be employed for by-passing defective sheets selected by the detector.

Figure 4 is a top plan view of a portion of the mechanism shown in Figure 3.

Figure 5 is a vertical section through the master condenser of the detecting apparatus, a web of material being shown therein and there also being illustrated a moisture applicator.

Figure 6 is an elevation of a portion of the delivery end of the apparatus.

Figure 7 is a transverse section through a portion of the apparatus and showing the moisture applicator in elevation, a portion being broken away.

Figure 8 is an enlarged section on line 8—8, Figure 3, parts being broken away.

Figure 9 is a section on line 9—9, Figure 3, parts being broken away.

Figure 1:
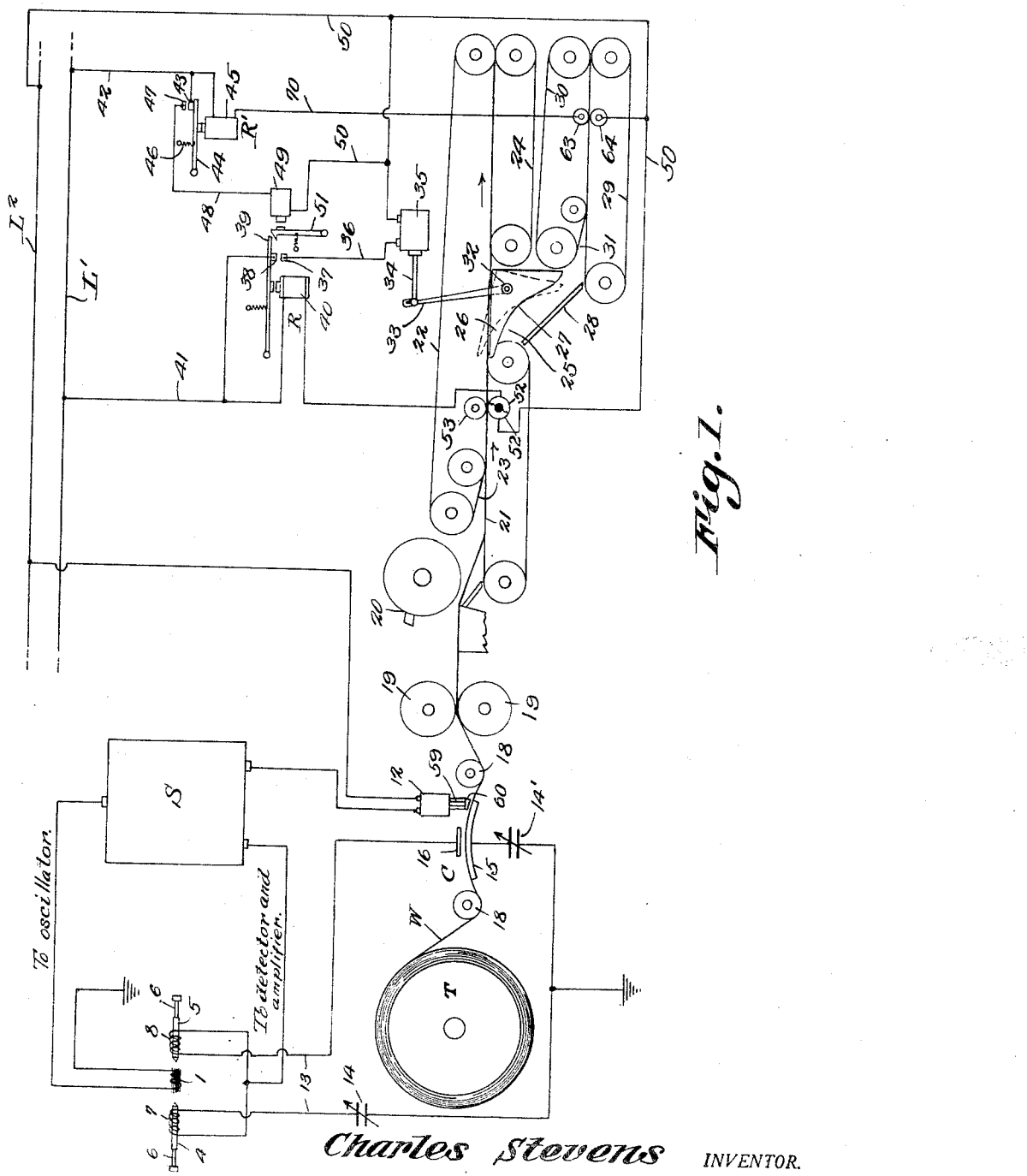
Figure 1 is a view in diagram showing the complete apparatus adapted for the detection of structural faults in sheet material.

In the accompanying drawings the invention has been illustrated for use in detecting structural defects in sheet material such as paper, textile fabrics, etc. In the paper art, for example, it is impossible to produce a web which does not contain flaws or defects of one kind or another. These may be in the nature of small specks which are liable to be located at any point within the web. They may consist of lumps of foreign material, such as a solidified chemical used in the manufacture of the web, or they may comprise variations in thickness or smoothness of the material.

The present invention comprises three major portions, namely, a means for locating structural defects under test in such manner as to affect a circuit influenced thereby, a means for detecting and amplifying any faults produced in said controlled circuit by the material under test, and a means for utilizing the amplified current for the purpose of actuating mechanisms acting on the material under test.

Referring to the drawings in detail, and particularly to Fig. 2, the means utilized for locating structural faults in the material under test includes a feeder coil 1, one terminal of which can be grounded as shown, while the other terminal can lead to a ground through the secondary of a transformer 2 the primary of which is part of the plate circuit of an oscillator 3. It has been found in practice that this oscillator can consist of a standard tube commercially known as 6K7.

The feeder coil 1 is interposed between opposed permanent magnets 4 and 5 mounted for minute adjustment toward or from each other by means of screws 6 or the like and each having a coil of very high impedance. The coils on the respective magnets have been indicated at 7 and 8 and are 180° out of phase. The permanent magnets 4 and 5 are of high permanence.

Those terminals of the coils 7 and 8 remote from the feeder coil 1 are electrically connected to a detecting and amplifying circuit indicated at S, S in diagram in Fig. 2, this circuit including, in the present case, a first stage of amplification, indicated at 9, a second stage of amplification, indicated at 10, a detector output indicated at 11, and a rectifier 11', all of which are assembled in the usual way for the purpose of amplifying detected variations or pulsations produced in the manner hereinafter explained. Included in the circuit of the output detector can be a solenoid 12.

In practice, tubes known commercially as 6K7 have been used for the stages of amplification. The rectifier can be of the standard type 25Z6, while the detector tube can be of the standard 6R7 type. Obviously more than two stages of amplification can be employed but it has not been deemed necessary to illustrate more than the two.

Those ends of the coils 7 and 8 nearest the feeder coil 1 are provided with electrical connections 13, 13 leading respectively to ground through adjustable condensers 14, 14'. A fault locating condenser indicated generally at C is located in the connection 13 at the side of said ground connection to which coil 8 and adjustable condenser 14' are connected. This fault locating condenser is of a special construction and includes a dielectric plate 15 spaced from but cooperating with a metallic plate 16. This latter plate is joined to the coil 8 directly by the connection 13 while the dielectric plate 15 is connected directly by connection 13 through condenser 14' to the ground, the condenser 14' having considerable leakage.

Plates 15 and 16 constitute the master condenser controlling the operation of the entire apparatus and for the purpose of effecting proper operation under varying conditions, it is preferred to mount the plates 16 adjustably as shown for example in Fig. 6 wherein the plate is supported by adjusting screws 17. Thus the distance between the two plates can be varied to meet the requirements. As plate 15 is connected to the ground through the adjustable condenser 14' this latter condenser, operating as a valve, will prevent overcharging of the plate 15.

In the adaptation of the invention illustrated, the material to be tested is supplied in the form of a continuous web W which, leaving the roll T (Fig. 1), can be passed under guide rolls 18 and over and in constant wiping contact with the dielectric plate 15, this web of course thus being positioned between the two plates 15 and 16 of the master condenser. The web of paper is then directed by superposed rolls 19 or the like to a cutter 20 which operates to sever the web into sheets, these sheets then being directed onto an endless belt consisting of laterally spaced tapes 21.

An upper feeder belt also formed of tapes, as indicated at 22, is movable longitudinally of the belt 21, the lower flight thereof being driven in the same direction as the upper flight of the lower belt 21 and said lower flight of belt 22 having one end portion thereof inclined as at 23 so as thus to form a throat into which severed sheets can be fed preparatory to being carried by the belts 22 and 21 toward the outlet end of the apparatus. Belt 22 is longer than belt 21 and projects therebeyond so as to overlie another endless conveyer belt 24 cooperating with belt 22 to continue the movement of the material toward the outlet.

Belt 24, however, is spaced from belt 21 to provide a throat 25 in which is located a transverse series of parallel by-passing fingers 26. These fingers are so shaped and proportioned that, when in normal positions, their upper surfaces are substantially in line with the top flights of the belts 21 and 24 so that material being delivered from belt 21 will slide over the fingers onto belt 24, the transfer being effected by the lower flight of the belt 22. The lower edges of the fingers constitute deflections and have been indicated at 27, these deflecting edges being located above and spaced from a plate 28 which is inclined downwardly from the delivery end portion of the belt 21 to the receiving end portion of another endless conveyer 29 which, like the belt 21, is formed preferably of laterally spaced tapes.

A further feeder belt 30 likewise formed preferably of laterally spaced tapes, is positioned above the belt 29 and has its lower flight cooperating with the top flight of belt 29 so that the two belts thus operate to deliver from the outlet end of the machine any sheets that may be directed onto the belt 29 from the plate 28. That end of belt 30 nearest the deflecting fingers 26 is arranged at such an angle as to provide a throat or pass 31 into which sheets can be directed.

The deflecting fingers 26 are mounted to rock about an axis indicated at 32 and secured to these fingers so as to move therewith is an arm 33 connected to the core 34 of a solenoid 35. One terminal of this solenoid is electrically connected, as at 36, to a contact 37 of a relay R, this contact being normally spaced from a contact 38 carried by the spring-restrained armature 39 of an electromagnet 40. This contact 38, as well as one terminal of the magnet 40, are electrically connected, as at 41, to one side L' of a power circuit. The same side of said power circuit is electrically connected, as at 42, to a contact 43 of a second relay R' and said contact is carried by the armature 44 of an electromagnet 45. One terminal of this electromagnet is also electrically connected to contact 43.

A spring 46 or the like serves to urge the contact 43 of second relay R' normally toward a fixed contact 47 electrically connected, as at 48, to an electromagnet 49 which, in turn, together with magnets 35 and 45, is electrically connected at 50 to the other side L² of the power circuit. The armature of magnet 49 is in the form of a spring-restrained latch 51 the head of which is positioned normally under the armature 38 so that said armature can thus be supported yieldingly away from the magnet 40.

One or more roller contacts 52 are located below and extend upwardly between certain of the tapes of the belt 21. If two of these roller contacts are used, as shown in Fig. 8, they will be insulated from each other, one of them being electrically connected to one terminal of magnet 40 while the other is electrically connected to one of the main leads as shown. Thus whenever the circuit is closed between the two roller contacts, a circuit will be closed to the magnet 40 by way of the connections 50 and 41.

It is intended to close this circuit at the contact rollers by means of moisture applied at a proper point to a sheet of material passing over the rollers. For the purpose of insuring an intimate contact between this sheet of paper or the like and the rollers 52, a pair of presser rollers 53 are arranged oppositely thereto, these rollers being driven in any suitable manner so as to have a peripheral speed equal to that of the material contacted thereby.

Both sets of rollers 52 and 53 preferably are supported by a member 54 (Fig. 3) adjustably mounted on a rod 55 which is fixedly supported beyond one side of the belts 21 and 22 and has a laterally extended arm 56 from which springs 57 are extended, these springs serving to support the respective contact rollers 52. Member 54 also provides a bearing for the shaft 58 carrying the presser rollers 53.

The solenoid 12 heretofore referred to is located above a portion of the plate 15 and when energized, serves to force its core 59 against a pad 60 which is yieldingly supported above the path of the material under test and is connected by a wick 61 to a water container 62 or the like. Thus whenever magnet 12 is energized the pad 60 will be depressed against the material passing thereunder and leave a small moist area thereon. This action is momentary and the moist area is so positioned that when it reaches the contact rollers 52, it will complete a circuit between these rollers and thence to the magnet 40. The wick and pad can be yieldingly supported in any suitable manner and the core 59 can be likewise yieldingly supported in any obvious way.

Located between two of the tapes of each of the belts 30 and 29 and out of line with the contact rollers 52 are upper and lower contact rollers 63 and 64 which normally are in contact at a point in line with the pass between the belts 29 and 30. The lower roller 64 is yieldingly supported by a spring 64' extending from an arm 65 projecting laterally from a member 66. This member is adjustably mounted on a rod 67 fixedly supported beyond one side of the belts. The upper roller 63 is mounted on a shaft 68 supported in a bearing arm 69 on member 66. Thus the two rollers 63 and 64 normally are in contact, roller 63 being electrically connected as at 70 to magnet 45 while roller 64 is electrically connected to one of the power leads by way of connection 50.

In view of the fact that the rollers 63 and 64 are normally in contact, the circuit to magnet 45 is normally closed with the result that the circuit through contacts 43 and 47 to the magnet 49 is normally broken. Furthermore as the contact rollers 52 normally are out of circuit with each other, the circuit to magnet 40 is normally broken as is also the circuit to magnet 35 inasmuch as contacts 37 and 38 normally are spaced apart, armature 39 being unlatched.

As long as the magnet 35 is deenergized, the deflecting fingers 26 are in their normal positions so that sheets of paper leaving the top flight of belt 22 can be carried thereover onto the top flight of belt 24. This normal position of the fingers has been indicated by full lines in Fig. 1.

The apparatus herein described is designed primarily for use in testing sheet material in web form and for cutting the web into sheets, the mechanism operating to by-pass any sheets containing any one of the defects capable of detection by this apparatus. The method of detection is based upon the principle that any variation from a predetermined standard of material passing between plates of a condenser will affect the dielectric constant or capacitance of an electric circuit. In the present case the magnets 4 and 5 are minutely adjusted toward the feeder coil 1 so as to be equally spaced therefrom. This coil which is connected to the output of the oscillator sets up a field which penetrates equally the two fields set up by the coils 7 and 8 when the circuit is properly balanced. Balancing of the circuit with sheet material of a standard grade located in the master condenser between plates 15 and 16 can be effected by manipulating the adjustable condenser 14. Following the establishment of a perfect balance in the said circuit the web of material indicated at W which is to be tested is set in motion and is drawn at a predetermined speed over the dielectric plate 15 of the master condenser C. This action sets up a high potential charge due to friction of the web against plate 15 and this charge, due to friction, will have no effect on the detecting circuit, as the latter is responsive only to alternating or pulsating currents. As the circuit including the pick-up coils 7 and 8 has been balanced with a sheet of material of standard requirements located within the master condenser, it will be apparent that any movement of the web of material will not disturb the balance of the circuit as long as the web contains no defects which would lower the standard of the product.

It will be obvious to those skilled in the art that the potential between the metal plate 16 and the dielectric plate 15 will vary with the dielectric constant between the plates and any change in the physical characteristics of the material under test will vary the potential. For example such variations can be caused by minute spots on the material, by foreign substances in or on the material, by variations in thickness of the material, etc., many of the defects being of such a nature as to escape detection by the eye.

As the coils 7 and 8 are 180° out of phase and of very high impedance, any variations in dielectric constant in the master condenser due to variations in physical characteristics of the material under test, will set up variations in the induced currents due to the feeder coil 1 in the coils 7 and 8, thereby throwing the circuit out of balance so that beats or pulsations are thus produced which thereafter are amplified.

By locating the solenoid 12 as indicated, such amplification will result in energizing this solenoid so that the pad 60 will be pushed downwardly against the sheet material momentarily the instant the circuit is thrown out of balance because of the presence of a defect in the master condenser. Thus a moist spot will be present on the web adjacent to the defect and when the sheet bearing the defect and the moist portion is cut from the web at 20 and deposited on belt 21, it will be carried between the presser rollers 53 and the contact rollers 52.

The moist portion of the defective sheet will connect the contact rollers 52 electrically so that magnet 40 thus will be energized and armature 39 will be pulled down and latched. The latching of the armature will close the circuit to magnet 35 through the contacts 37 and 38 and this energized magnet 35 instantly will actuate arm 33 so as to swing the deflecting fingers 26 away from normal position and up to the dotted line position shown in Fig. 1. This occurs just as the defective sheet approaches the fingers and, consequently, said sheet will be directed downwardly onto plate 28 and into the pass or throat 31 between the belts 29 and 30. The instant the moist portion of the sheet passes from between rollers 52 and 53, the circuit to magnet 40 is broken.

As the advancing edge of the defective sheet reaches the contact rollers 63 and 64 it enters between said rollers and breaks their electrical connection so that magnet 45 is deenergized. Consequently armature 44 shifts automatically to bring contact 43 against contact 47, thereby closing the circuit to magnet 49 which acts to unlatch armature 39, deenergize magnet 35 and restore all of the parts to their initial positions. This action occurs just as the advancing edge of the defective sheet passes into position between contact rollers 63 and 64 while the opposite edge thereof leaves the belt 21. Consequently the deflecting fingers 26 drop back to normal position before the next following sheet reaches them and if that sheet meets the required standards, it will travel over the fingers and be delivered from between the belts 24 and 22. The defective sheets which have been by-passed will be delivered from between the belts 29 and 30.

It is to be understood that the apparatus herein described and illustrated is only one type which may be used in connection with the particular detecting means employed and it is to be further understood that while the invention is especially useful for the purpose of detecting structural defects in paper, it can also be employed for locating defective materials of other kinds such as textiles, and, in fact, any materials that are dielectric.

In order that the apparatus may properly function it is preferred to shield the generating circuit from the amplifying circuit as indicated by broken lines in Fig. 2 at X.

Obviously by mounting the permanent magnets so that they can be adjusted longitudinally, a very minute adjustment of the pick-up coils relative to the feeder coil can be effected and this adjustment can be employed to supplement that provided by the adjustable condenser in one side of the circuit or can be used in lieu thereof.

What is claimed is:

1. Apparatus of the class described including a normally balanced circuit leading to an amplifying and detecting system, said circuit including opposed coils 180° out of phase, means for inducing high-frequency voltage in said coils, a condenser in that side of the circuit leading to one of the coils, said condenser including a grounded dielectric plate and a plate spaced therefrom, means for feeding sheet material through the condenser with a wiping action on the dielectric plate, the circuit being maintained in balance except when the dielectric constant is varied by variation of the structural characteristics of the sheet material from normal, detecting means connected to said circuit and adapted to rectify the output delivered to said circuit when unbalanced, an electromagnet connected to the output of said detecting means, means actuated by the electromagnet when energized for applying moisture to the sheet material, a by-passing element normally positioned outside the path of the sheet material, electrically actuated means for shifting said element into the path of the sheet material, and means controlled by the moist portion of the sheet material for closing said circuit to shift the by-passing element into sheet-deflecting position.

2. Apparatus of the class described including a normally balanced circuit leading to an amplifying and detecting system, said circuit including opposed coils 180° out of phase, means for inducing high frequency voltages in said coils, a condenser in that side of the circuit leading to one of the coils, said condenser including a grounded dielectric plate and a plate spaced therefrom, means for feeding sheet material through the condenser with a wiping action on the dielectric plate the circuit being maintained in balance except when the dielectric constant is varied by variation of the structural characteristics of the sheet material from normal detecting means connected to said circuit and adapted to rectify the output delivered by said circuit when unbalanced, an electromagnet connected to the output of said detecting means, means actuated by the electromagnet when energized for applying moisture to the sheet material, a by-passing element normally positioned outside the path of the sheet material, electrically actuated means for shifting said element into the path of the sheet material, means controlled by the moist portion of the sheet material for closing said circuit to shift the by-passing element into sheet-deflecting position, and means controlled by the deflected sheets for restoring the by-passing element and its circuit to their normal setting.

3. In electrical inspection and sorting apparatus for sheet material, a test condenser comprising spaced plates between which said sheet material passes, a balanced circuit having said test condenser connected into one of its balanced sides and having an output connection, means for supplying high frequency energy in balanced relation to both sides of said circuit, said circuit being adapted to deliver high frequency energy from its output connection when it is unbalanced by the passage of non-standard sheet material through said test condenser, detecting means connected for rectifying the output delivered from said output connection, electrically operable wet spot applying means connected for operation by the output of said detecting means and mounted for applying when actuated a wet spot to said sheet material after passage thereof through said test condenser for marking a non-standard portion thereof, and electrically operable sorting means arranged to receive said sheet material after passage through said test condenser and past said wet spot applying means, and adapted to deliver standard sheets unmarked by a wet spot to a first outlet and to deliver to a second outlet non-standard sheets so marked with a wet spot, by electrical response to said wet spot.

4. Apparatus as set forth in claim 3, in combination with re-set means positioned in the path of a non-standard sheet from said sorting means to said second outlet and adapted upon the passage of a sheet past said re-set means to re-set said sorting means into position to deliver sheets to said first outlet.

5. Apparatus according to claim 3, and in which said balanced circuit comprises a pair of coils having two connections respectively between one terminal of each coil and one terminal of the other coil, one of said connections comprising in series said test condenser and a control condenser, and having an output connection between said two named condensers, said coils being mounted and connected to oppose each other.

CHARLES STEVENS.